(12) United States Patent
Adachi

(10) Patent No.: US 8,756,058 B2
(45) Date of Patent: Jun. 17, 2014

(54) SPEECH RECOGNITION SYSTEM, SPEECH RECOGNITION RESULT OUTPUT METHOD, AND SPEECH RECOGNITION RESULT OUTPUT PROGRAM

(75) Inventor: Fumihiro Adachi, Tokyo (JP)

(73) Assignee: NEC Corporation, Tokyo (JP)

( * ) Notice: Subject to any disclaimer, the term of this patent is extended or adjusted under 35 U.S.C. 154(b) by 1413 days.

(21) Appl. No.: 12/280,253

(22) PCT Filed: Feb. 22, 2007

(86) PCT No.: PCT/JP2007/053263
§ 371 (c)(1),
(2), (4) Date: Aug. 21, 2008

(87) PCT Pub. No.: WO2007/097390
PCT Pub. Date: Aug. 30, 2007

(65) Prior Publication Data
US 2010/0217598 A1      Aug. 26, 2010

(30) Foreign Application Priority Data

Feb. 23, 2006   (JP) ................................. 2006-046154

(51) Int. Cl.
*G10L 15/00*   (2013.01)
*G10L 15/22*   (2006.01)
*G10L 15/32*   (2013.01)

(52) U.S. Cl.
CPC ...................................... *G10L 15/32* (2013.01)
USPC .......................................... 704/251; 704/270

(58) Field of Classification Search
None
See application file for complete search history.

(56) References Cited

U.S. PATENT DOCUMENTS 5,797,116 A * 8/1998 Yamada et al. .................. 704/10
5,873,061 A * 2/1999 Hab-Umbach et al. ....... 704/254

(Continued)

FOREIGN PATENT DOCUMENTS

JP   08-063476 A   3/1996
JP   09-050291 A   2/1997

(Continued)

OTHER PUBLICATIONS

Bazzi, "Modeling Out-of-Vocabularywords for Robust Speech Recognition", International Conference on Spoken Language Processing (ICSLP), 2000.*

(Continued)

*Primary Examiner* — Jialong He
(74) *Attorney, Agent, or Firm* — Sughrue Mion, PLLC

(57) ABSTRACT

A speech recognition system in which, even when the user makes an utterance including a word that satisfies a predetermined condition such as an unknown word, such a fact can be presented to the user, and the user can confirm the fact easily, is provided. The speech recognition system includes a word speech recognition section that converts input speech to a recognition result word sequence by using a predetermined word dictionary for recognition, a syllable recognition section that converts input speech to a recognition result syllable sequence, a segment determination section that determines a segment that corresponds to a predetermined condition which is a ground for estimating that a word in the converted recognition result word sequence is an unknown word, and an output section that obtains a partial syllable sequence from the recognition result syllable sequence corresponding to the determined segment, and outputs one or more word entries, which are in the vicinity of a position at which the partial syllable sequence is arranged in the word dictionary for recognition in which words are arranged in the order defined for word entries, together with the recognition result word sequence.

21 Claims, 6 Drawing Sheets

(56) References Cited

U.S. PATENT DOCUMENTS

| | | | |
|---|---|---|---|
| 6,662,159 B2 * | 12/2003 | Komori et al. | 704/255 |
| 6,785,650 B2 * | 8/2004 | Basson et al. | 704/235 |
| 6,990,449 B2 * | 1/2006 | Case | 704/260 |
| 7,310,600 B1 * | 12/2007 | Garner et al. | 704/234 |
| 2001/0037200 A1 * | 11/2001 | Ogawa et al. | 704/246 |
| 2002/0072907 A1 * | 6/2002 | Case | 704/260 |
| 2002/0138265 A1 * | 9/2002 | Stevens et al. | 704/251 |
| 2005/0143998 A1 * | 6/2005 | Ogawa | 704/251 |

FOREIGN PATENT DOCUMENTS

| | | |
|---|---|---|
| JP | 09-258767 A | 10/1997 |
| JP | 09-288673 A | 11/1997 |
| JP | 10-097284 A | 4/1998 |
| JP | 2001-236089 A | 8/2001 |
| JP | 2002-140094 A | 5/2002 |
| WO | 02/075723 A1 | 9/2002 |
| WO | 2005/122144 A1 | 12/2005 |

OTHER PUBLICATIONS

P. Yu and F. Seide, "A hyprid word/phoneme-based approach for improved vocabulary-independent search in spontaneous speech," Proc. Interspeech 2004, pp. 293-296, 2004.*

* cited by examiner

FIG.2

RECOGNITION RESULT:

[ え い が か ん ] を 探 し た い

( [EIGAGAN] WO SAGASHITAI )

| | |
|---|---|
| へ | [え] |
| (HE) | ([ E ]) |
| 絵 | [え] |
| (E "PICTURE") | ([ E ]) |
| えー | [えー] |
| (EE) | ([ E E ]) |
| 英雄 | [えーゆー] |
| (EIYUU "HERO") | ([EEYUU]) |
| 影響 | [えいきょう] |
| (EIKYOU "INFLUENCE") | ([EIKYOU ]) |
| 英語 | [えいご] |
| (EIGO "ENGLISH") | ([EIGO]) |

INPUT SPEECH: "映画館を探したい"
(EIGAKAN WO SAGASHITAI
"I WANT TO LOOK FOR A MOVIE THEATER")
* "映画館 (EIGAKAN)" IS AN UNKNOWN WORD)

RECOGNITION RESULT WORD SEQUENCE:
"英語版を探したい"
(EIGOBAN WO SAGASHITAI)

RECOGNITION RESULT SYLLABLE SEQUENCE:
"えいががんをさがしたい"
(EIGAGAN WO SAGASHITAI)

FIG.5

32: WORD DICTIONARY FOR RECOGNITION

| | |
|---|---|
| アーティスト (AATYISUTO "ARTIST") | [あーてぃすと] ([AATYISUTO]) |
| ああ (AA) | [ああ] ([ AA ]) |
| 開い (AI) | [あい] ([ AI ]) |
| アイコン (AIKON "ICON") | [あいこん] ([AIKON]) |
| 合図 (AIZU "SIGN") | [あいず] ([AIZU]) |
| 相手 (AITE "OPPONENT") | [あいて] ([AITE]) |
| ⋮ | ⋮ |

FIG.6

1. 北海道札幌市
   (SAPPORO, HOKKAIDO)
2. 北海道室蘭市
   (MURORAN, HOKKAIDO)
3. 北海道苫小牧市
   (TOMAKOMAI, HOKKAIDO)
4. 北海道函館市
   (HAKODATE, HOKKAIDO)
5. 北海道旭川市
   (ASAHIKAWA, HOKKAIDO)

Related Art

SPEECH RECOGNITION SYSTEM, SPEECH RECOGNITION RESULT OUTPUT METHOD, AND SPEECH RECOGNITION RESULT OUTPUT PROGRAM

TECHNICAL FIELD

The present invention relates to a speech recognition system, a speech recognition result output method, and a speech recognition result output program, and in particular, to a system, a method, and a program for confirming a result of speech recognition.

BACKGROUND ART

In a system that recognizes speech uttered by the user and carries out searching and translation by using a result of the recognition, a recognition error has a significant impact on a result of searching or translation output finally. As a solution for such false recognition, Patent Document 1 describes an example of a method that allows the user to easily correct a result of recognition even when false recognition is generated. This is achieved by displaying lower candidates, in addition to a first candidate, of a result of speech recognition on a display screen as shown in FIG. 6. In the example of the display screen shown in FIG. 6, "北海道札幌市 (Sapporo, Hokkaido)" is a first candidate. Below the first candidate, lower candidates, which are "北海道 室蘭市 (Muroran, Hokkaido)", "北海道苫小牧市 (Tomakomai, Hokkaido)", "北海道函館市 (Hakodate, Hokkaido)", "北海道旭川市 (Asahikawa, Hokkaido)", and the like, are displayed in the order of probable vocabularies.

Patent Document 1: JP 09-050291-A

DISCLOSURE OF THE INVENTION

Problems to be Solved by the Invention

In the system that recognizes speech uttered by the user and carries out searching and translation by using a result of the recognition, there is a case where the user makes an utterance of a word (hereinafter referred to as an "unknown word") that does not exist in a recognition dictionary. In this case, a result in which the uttered word is falsely recognized as a different word existing in the recognition dictionary is output. Also, the uttered word does not appear in a first candidate or lower candidates in the result of the recognition at all. For this reason, even when other lower candidates of a result of recognition are output in addition to a first candidate as described in Pat. Document 1, the user cannot correct a section that is falsely recognized.

Further, consideration will be made with respect to a case where there does not exist a word, which the user desires to use for correction, in displayed lower candidates. In this case, the user cannot distinguish whether the word uttered by the user is a word that can be recognized (exists in the dictionary) and is not included in the displayed lower candidates by accident, or the word cannot be recognized (does not exist in the dictionary) and cannot be recognized from the first place. In the former case, a correct result of recognition may be obtained by making an utterance again. However, in the latter case, a correct result of recognition is not obtained by making an utterance again. As a result, the user may repeatedly make an utterance including a word (an unknown word) that cannot be recognized from the first place again and again.

An object of the present invention is to provide a speech recognition system that can present to the user and allow the user to easily check which word is an unknown word when the user makes an utterance including the unknown word.

Means for Solving the Problems

The speech recognition system according to the present invention includes a word speech recognition section that converts input speech to a recognition result word sequence by using a predetermined word dictionary for recognition; a syllable recognition section that converts input speech to a recognition result syllable sequence; a segment determination section that determines a segment that corresponds to a predetermined condition which is a ground for estimating that a word in the converted recognition result word sequence is an unknown word; and an output section that obtains a partial syllable sequence from the recognition result syllable sequence corresponding to the determined segment, and outputs one or more word entries, which are in the vicinity of a position at which the partial syllable sequence is arranged in the word dictionary for recognition in which words are arranged in the order defined for word entries, together with the recognition result word sequence.

According to the speech recognition system, the word speech recognition section outputs a recognition result word sequence including a combination of kana and kanji, and the syllable recognition section outputs a recognition result syllable sequence, as a result of recognition of input speech. The segment determination section determines a segment corresponding to a predetermined condition in the recognition result word sequence. The display section displays the recognition result word sequence and word entries in the vicinity of a position at which a partial syllable sequence is arranged in the word dictionary for recognition. In such a configuration, even when the user makes an utterance including a predetermined unknown word, such a fact can be presented to the user, and the user can confirm the fact easily.

In the above speech recognition system, the syllable recognition section may convert input speech to a recognition result syllable sequence by using a predetermined syllable dictionary for recognition. In this manner, for example, when an unknown word is included in input speech, a recognition result syllable sequence can be obtained with high accuracy.

In the above speech recognition system, the output section may output a recognition result word sequence after replacing the recognition result word sequence with a partial syllable sequence with respect to a segment determined by the segment determination section. In this manner, the user can check whether an uttered word is correctly recognized as a syllable sequence or not.

In the above speech recognition system, the output section may output a segment determined by the segment determined section by highlighting the segment. In this manner, the user can clearly know which part of an output word sequence corresponds to a predetermined condition.

In the above speech recognition system, the defined order may be the Japanese syllabary order. In this manner, word entries may be displayed in the arranging order that is easier for the user to understand intuitively.

In the above speech recognition system, the output section may include a function of changing output word entries of the word dictionary for recognition in accordance with an instruction from the user. In this manner, even when a syllable sequence which is different from a word uttered by the user is displayed in error, and the word dictionary for recognition is displayed with respect to a location which should not actually be displayed, the user can change the position of the displayed word dictionary for recognition to display a correct location.

In the above speech recognition system, the output section may include a function that is operated when the user selects a word entry in the word dictionary for recognition, and replaces a character string displayed in a segment determined by the segment determination section with a character string for display of the selected word entry. In this manner, in case a word uttered by the user exists in the displayed word dictionary (that is, the system determines that the word is an unknown word), or in case the user desires to input a word, such as a synonym, which is different from the word input by speech of the user instead, the user can correct a recognition result character string.

In the above speech recognition system, the output section may include a function of changing a range of a segment determined by the segment determination section in accordance with an instruction from the user. In this manner, in case the segment determination section determines a segment corresponding to a predetermined condition in error, the user can correct the segment.

In the above speech recognition system, the output section may include a function of changing an output content in accordance with a new segment, which is obtained in a manner that a range of a segment is changed in accordance with an instruction of the user. In this manner, the output section can display a content in accordance with a result of change of a segment, in such a manner as changing a displayed section of the word dictionary for recognition to a correct one.

The speech recognition result output method according to the present invention includes a word speech recognition step of converting input speech to a recognition result word sequence by using a predetermined word dictionary for recognition; a syllable recognition step of converting input speech to a recognition result syllable sequence; a segment determination step of determining a segment that corresponds to a predetermined condition which is a ground for estimating that a word in the converted recognition result word sequence is an unknown word, and an output step of obtaining a syllable sequence for a step from the recognition result syllable sequence corresponding to the determined segment, and outputting one or more word entries, which are in the vicinity of a position at which the syllable sequence for a step is arranged in the word dictionary for recognition in which words are arranged in the order defined for word entries, together with the recognition result word sequence.

According to the above speech recognition result output method, speech input in the word speech recognition step and the syllable recognition step is converted to a recognition result word sequence including a combination of kana and kanji and a recognition result syllable sequence. The segment determination step determines a segment corresponding to a predetermined condition in the recognition result word sequence. The display step displays the recognition result word sequence and word entries in the vicinity of a position at which a partial syllable sequence is arranged in the word dictionary for recognition. In the method as described above, even when the user makes an utterance including a word that satisfies a predetermined condition, such a fact can be presented to the user, and the user can confirm the fact easily.

In the above speech recognition result output method, the syllable recognition step may convert input speech to a recognition result syllable sequence by using a predetermined syllable dictionary for recognition. In this manner, for example, when an unknown word is included in input speech, a recognition result syllable sequence can be obtained with high accuracy.

In the above speech recognition result output method, the output step may output a recognition result word sequence after replacing the recognition result word sequence with a partial syllable sequence with respect to a segment determined by the segment determination section. In this manner, the user can check whether an uttered word is correctly recognized as a syllable sequence or not.

In the above speech recognition result output method, the output step may output a segment determined by the segment determination section by highlighting the segment. In this manner, the user can clearly know which part of an output word sequence corresponds to a predetermined condition.

In the above speech recognition result output method, the defined order may be the Japanese syllabary order. In this manner, word entries may be displayed in the arranging order that is easier for the user to understand intuitively.

In the above speech recognition result output method, in the output step, the output word entries of the word dictionary for recognition may be changed in accordance with an instruction of the user. In this manner, even when a syllable sequence which is different from a word uttered by the user is displayed in error, and the word dictionary for recognition is displayed with respect to a location which should not actually be displayed, the user can change the position of the displayed word dictionary for recognition to display a correct location.

In the above speech recognition result output method, in the output step, when the user selects a word entry in the word dictionary for recognition, a character sequence displayed in a segment determined by the segment determination section may be replaced with a character sequence for display of the selected word entry. In this manner, in case a word uttered by the user exists in the displayed word dictionary (that is, the result output method determines in error that the word is an unknown word), or in case the user desires to input a word, such as a synonym, which is different from the word input by speech of the user instead, the user can correct a recognition result character sequence.

In the above speech recognition result output method, in the output step, a range of a segment determined by the segment determination section can be changed in accordance with an instruction of the user. In this manner, in case a segment corresponding to a predetermined condition is determined in error in the segment determination step, the user can correct the segment.

In the above speech recognition result output method, in the output step, an output content may be changed in accordance with a new segment obtained by changing the range according to an instruction of the user. In this manner, a content can be displayed in accordance with a result of change of a segment, in such a manner as changing a displayed section of the word dictionary for recognition to a correct one.

The speech recognition result output program according to the present invention allows a computer to execute: word speech recognition processing for converting input speech to a recognition result word sequence by using a word dictionary for recognition; syllable recognition processing for converting input speech to a recognition result syllable sequence; segment determination processing for determining a segment that corresponds to a predetermined condition which is a ground for estimating that a word in the converted recognition result word sequence is an unknown word; and output processing for obtaining a partial syllable sequence from the recognition result syllable sequence corresponding to the determined segment, and outputting one or more word entries, which are in the vicinity of a position at which the partial syllable sequence is arranged in the word dictionary for recognition in which words are arranged in the order defined for word entries, together with the recognition result word sequence.

According to the above speech recognition result output program, speech input in the word speech recognition processing and the syllable recognition processing is converted to a recognition result word sequence including a combination of kana and kanji and a recognition result syllable sequence. The segment determination processing determines a segment corresponding to a predetermined condition in the recognition result word sequence. The display processing displays the recognition result word sequence and word entries in the vicinity of a position at which a partial syllable sequence is arranged in the word dictionary for recognition. By controlling a computer to execute the processing as described above, even when the user makes an utterance including a word that satisfies a predetermined condition, such a fact can be presented to the user, and the user can confirm the fact easily.

In the above speech recognition result output program, the syllable recognition processing may convert input speech to a recognition result syllable sequence by using a predetermined syllable dictionary for recognition. In this manner, for example, when an unknown word is included in input speech, a recognition result syllable sequence can be obtained with high accuracy.

In the above speech recognition result output program, the output processing may output a recognition result word sequence after replacing the recognition result word sequence with a partial syllable sequence with respect to a segment determined by the segment determination section. In this manner, the user can check whether an uttered word is correctly recognized as a syllable sequence or not.

In the above speech recognition result output program, the output processing may output a segment determined by the segment determination section by highlighting the segment. In this manner, the user can clearly know which part of an output word sequence corresponds to a predetermined condition.

In the above speech recognition result: output program, the defined order may be the kana syllabary order. In this manner, word entries may be displayed in the arranging order that is easier for the user to understand intuitively.

In the above speech recognition result output program, in the output processing, the output word entries of the word dictionary for recognition may be changed in accordance with an instruction of the user. In this manner, even when a syllable sequence which is different from a word uttered by the user is displayed in error, and the word dictionary for recognition is displayed with respect to a location which should not actually be displayed, the user can change a position of the displayed word dictionary for recognition to display a correct location.

In the above speech recognition result output program, in the output processing, when the user selects a word entry in the word dictionary for recognition, a character sequence displayed in a segment determined by the segment determination section may be replaced with a character sequence for display of the selected word entry. In this manner, in case a word uttered by the user exists in the displayed word dictionary (that is, the result output program determines that the word is an unknown word), or in case the user desires to input a word, such as a synonym, which is different from the word input by speech of the user instead, the user can correct a recognition result character string.

In the above speech recognition result output program, in the output processing, a range of a segment determined by the segment determination section can be changed in accordance with an instruction of the user. In this manner, in case a segment corresponding to a predetermined condition is determined in error in the section determination processing, the user can correct the segment.

In the above speech recognition result output program, in the output processing, an output content may be changed in accordance with a new segment obtained by changing the range according to an instruction of the user. In this manner, a content can be displayed in accordance with a result of change of a segment, in such a manner as changing a displayed section of the word dictionary for recognition to a correct one.

Advantages of the Invention

According to the present invention, as a result of recognition of input speech, a recognition result word sequence including a combination of kana and kanji and a recognition result syllable sequence are output. Then, a segment corresponding to a predetermined condition in the recognition result word sequence is determined, and the recognition result word sequence and word entries in the vicinity of a position at which a partial syllable sequence is arranged in the word dictionary for recognition are displayed together. For this reason, even when the user makes an utterance including an unknown word, such a fact can be presented to the user, and the user can confirm the fact easily.

BRIEF DESCRIPTION OF THE DRAWINGS

FIG. 2 is a view showing an example of displaying a speech recognition result;

FIG. 5 is a view showing an example of a word dictionary for recognition; and

FIG. 6 is a view for explaining a conventional output method of a result of recognition.

EXPLANATION OF REFERENCE SYMBOLS

Figure 1:
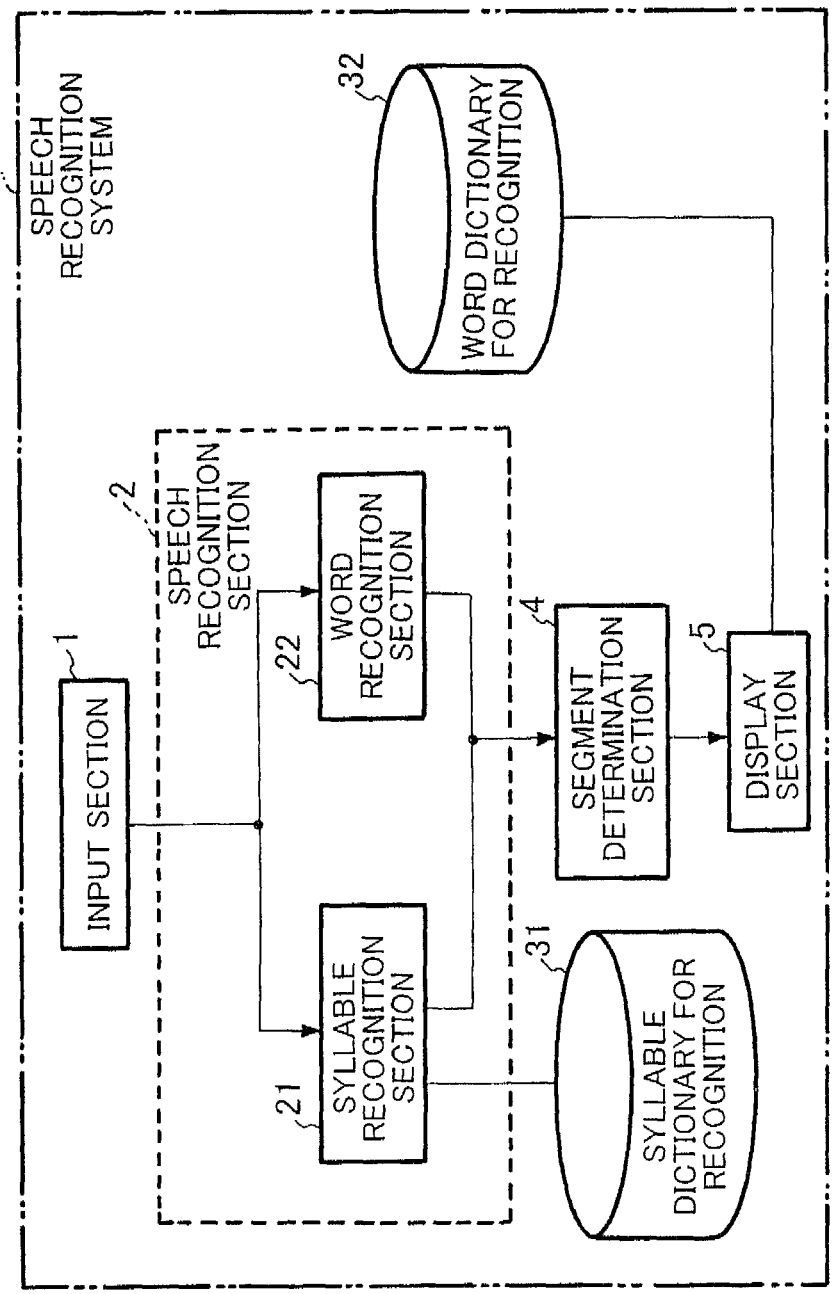
FIG. 1 is a block diagram showing a configuration of a speech recognition system as an exemplary embodiment of the present invention.

1: Input section
2: Speech recognition section
4: Segment determination section
5: Display section
10: Speech recognition system
21: Syllable recognition section
22: Word recognition section
31: Syllable dictionary for recognition
32: Word dictionary for recognition

BEST MODE FOR CARRYING OUT THE INVENTION

Next, description will be made with respect to a configuration and operation of a speech recognition system as an exemplary embodiment of the present invention with reference to the accompanying drawings.

FIG. 1 is a functional block diagram of a speech recognition system 10 according to the present exemplary embodiment. With reference to FIG. 1, the speech recognition system 10 includes an input section 1 that is for inputting speech by a speech input device, such as a microphone, a speech recognition section 2 that converts input speech to a word sequence and syllable sequence as a result of recognition of the input speech, a word dictionary 32 for recognition that stores an assembly of words which is a minimum unit of a recognition result word sequence, a segment determination section 4 that determines a segment corresponding to a predetermined condition in the input speech, and a display section 5 that outputs a final result on a display screen, such as a display, in a visually recognizable manner.

The speech recognition section 2 includes a syllable recognition section 21 and a word recognition section (corresponding to an example of the word speech recognition section of the present invention) 22. The syllable recognition section 21 converts the input speech to a recognition result syllable sequence, and outputs the recognition result syllable sequence to the segment determination section 4. The conversion to a syllable sequence may be carried out by using the syllable dictionary 31 for recognition, or by other methods. In addition, the word recognition section 22 converts the input speech provided by the input section 1 to a recognition result word sequence by using the word dictionary 32 for recognition, and outputs the recognition result word sequence to the segment determination section 4.

The syllable dictionary 31 for recognition stores a syllable that is a minimum unit of a recognition result syllable sequence.

As shown in FIG. 5, the word dictionary 32 for recognition stores word entries "アーティスト (aatyisuto (artist))", "ああ (aa)", "開い (ai)", "アイコン (aikon (icon))", "合図 (aizu (sign))", "相手 (aite (opponent))", and the like) that can be recognized in combination with a character sequence for display and reading information "あーてぃすと (aatyisuto)", "ああ (aa)", "あい (ai)", "あいこん (aikon)", "あいず (aizu)", "あいず (aite)", and the like) and the like. A displayed character sequence is expressed by a character sequence of mainly a combination of kanji and kana, and is used as a result of recognition. Reading information is expressed by a syllable sequence. Reading information is used when word entries of the word dictionary 32 for recognition are arranged in the order defined for word entries in advance, for example, the order of the Japanese syllabary order.

Figure 4:
FIG. 4 is a view showing an example of an output of a result of recognition and the like by a speech recognition section.

FIG. 4 shows an example of a result of recognition by the speech recognition section 2. Speech is converted to a recognition result word sequence "英語版を探したい (eigoban wo sagashitai)" as a combination of kana and kanji configured with a word stored in the word dictionary 32 for recognition as a minimum unit, and a recognition result syllable sequence "えいがばんを さがしたい (eigagan wo sagashitai)" configured with a syllable stored in the syllable dictionary 31 for recognition as a minimum unit. FIG. 4 shows an example in which, since "映画館 (eigakan (movie theater))" is an unknown word, the word is recognized as "映画版 (eigoban)" as a recognition result word sequence in error. In addition, an example including an error of a certain degree is shown with respect to a recognition result syllable sequence as well.

The segment determination section 4 determines a segment that is considered corresponding to a predetermined condition, such as an unknown word is uttered, in a recognition result word sequence output from the speech recognition section 2.

As shown in FIG. 2, the display section 5 outputs a recognition result word sequence 41 output from the speech recognition section 2, a recognition result syllable sequence 42, a segment determined by the segment determination section 4, and word entries 43 as part of the word dictionary 32 for recognition on the display screen of the display. The recognition result word sequence 41 specifies a segment determined as an unknown word segment by the segment determination section 4 by replacing a syllable with a corresponding partial syllable sequence, and expressing with signs ("[" and "]" in FIG. 2) in the recognition result syllable sequence 42 output from the speech recognition section 2, for example.

As for the word entries 43 as part of the word dictionary 32 for recognition, one or more (six in the example shown in FIG. 2) of word entries in the vicinity of a position, at which a partial syllable sequence corresponding to a segment determined as an unknown word segment should exist in the word dictionary 32 for recognition arranged in the Japanese syllabary order are displayed.

Figure 3:
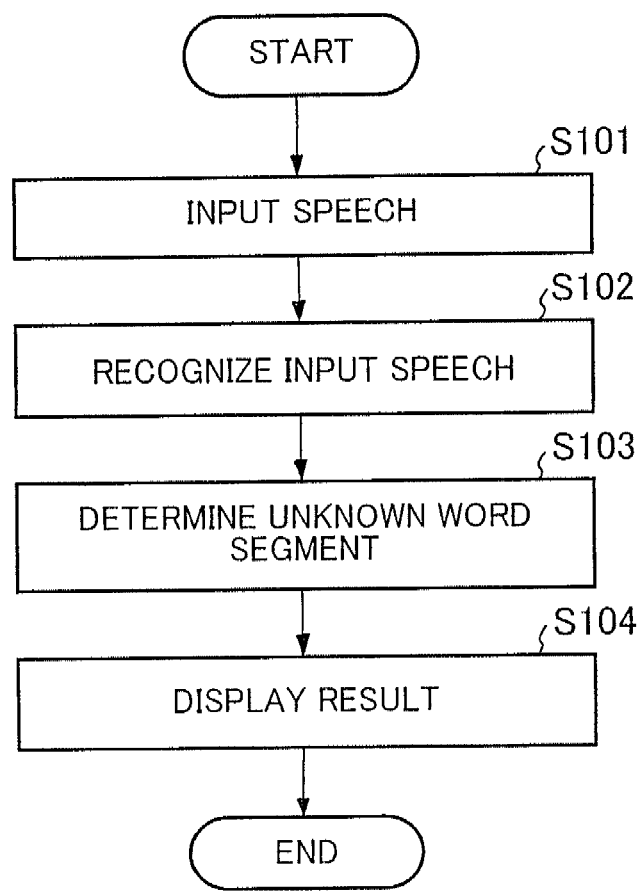
FIG. 3 is a flowchart showing operation of the speech recognition system.

Next, with reference to FIG. 1 and a flowchart in FIG. 3, description will be made in detail with respect to operation of the speech recognition system 10.

First, the user uses a speech input device, such as a microphone, to input speech to the speech recognition system 10 (Step S101). The input speech is supplied from the input section 1 to the speech recognition section 2.

Next, the speech recognition section 2 recognizes the speech being input (input speech) (Step S102). At this time, the word recognition section 22 uses the word dictionary 32 for recognition to convert the input speech to a recognition result word sequence with a word existing in the word dictionary 32 for recognition as a minimum unit. The syllable recognition section 21 converts the input speech to a recognition result syllable sequence with a syllable as a minimum unit. These character sequences obtained as a result of recognition by the speech recognition section 2 are supplied to the segment determination section 4.

Next, the segment determination section 4 determines a segment corresponding to a predetermined condition, such as an unknown word segment, with respect to the recognition result word sequence (S103).

Then, as a result of recognition, the display section 5 displays the recognition result word sequence, the determined segment, and word entries of part of the word dictionary for recognition arranged in the order defined in advance (Step S104). Here, the output word entries of the word dictionary for recognition may be changed in accordance with an instruction of the user. In addition, when the user selects the displayed word entry of the word dictionary 32 for recognition, a character sequence displayed in the segment determined by the segment determination section 4 may be replaced with a displayed character sequence of the selected word entry. Also, the segment determined by the segment determination section 4 may have a range thereof changed in accordance with an instruction of the user, and an output content may be changed in accordance with the changed range.

Therefore, according to the present exemplary embodiment, even when an unknown word is included in a content of utterance of the user, the segment determination section 4 determines a segment including the unknown word in a recognition result word sequence. Then, the display section 5 highlights the segment, and also displays word entries in the vicinity of a position at which a recognition result syllable sequence corresponding to the segment should be included in the word dictionary 32 for recognition on a display screen in a visually recognizable manner. For this reason, the user can easily check whether a word uttered by the user exists in the word dictionary 32 for recognition or not.

EXAMPLES

Next, an example of the present invention will be described with reference to the accompanying drawings. The example corresponds to the exemplary embodiment of the present invention described above.

Now, the user is assumed to utter "映画館を探したい (eigakan wo sagashitai (I want to look for a movie theater))" toward the speech recognition system 10. The word recognition section 22 carries out speech recognition processing with respect to the input speech "映画館を探したい (eigakan wo sagashitai)" by using a sound model, a language model, a dictionary for recognition, and the like. In this manner, a recognition result word sequence "映画館を探したい (eigoban wo sagashitai)" with a word registered in the word dictionary 32 for recognition as a minimum unit is generated (FIG. 4).

Here, "映画館 (eigakan (movie theater))" is considered an unknown word, and "英語版 (eigoban)" which is a combination of words in the word dictionary 32 for recognition having constituent syllables similar to those of the input speech is assumed to be recognized in error. In addition, at this time, the syllable recognition section 21 generates a recognition result syllable sequence "えいががんを さがしたい (eigagagan wo sagashitai) "with a syllable as a minimum unit in a similar manner with respect to the input speech "映画館を探したい (eigakan wo sagashitai (I want to look for a movie theater))" simultaneously.

This syllable sequence can be obtained by carrying out speech recognition processing with a syllable as a minimum unit by using the syllable dictionary 31 for recognition separately from speech recognition processing with a word as a unit as shown in FIG. 1. In addition, the syllable sequence can be obtained by processing that converts each word in a speech recognition result word sequence to reading information in the word dictionary 32 for recognition, without using the syllable dictionary 31 for recognition.

Next, the segment determination section 4 determines whether an unknown word that does not exist in the word dictionary 32 for recognition is included in an input utterance, and if included, in which segment the unknown word is included. In determination of false recognition segment in speech recognition, a score called reliability that expresses a degree of uncertainty in search at a certain segment in speech recognition processing with a value of 0 to 1 is often used. If the value is equal to or lower than a certain threshold value, possibility of false recognition can be determined to be high. When an unknown word is input, false recognition is always generated. Therefore, an unknown word segment can be determined by using the reliability described above.

Also, in addition to the determination method described above, a variety of determination methods can be considered. For example, there is a method that compares a character sequence obtained by converting a recognition result word sequence to syllables and a recognition result syllable sequence, and determines a segment with a largely different syllable, a segment with a low sound score and a low language score in speech recognition processing, and the like, as an unknown word segment. In the example described above, a section of "映画版 (eigaban)" in the speech recognition result word sequence is determined as an unknown word.

Here, the description was made with respect to a case where an input utterance is sentence input. However, when only a word is known to be uttered in advance like in a system that accepts a command, that is, when a recognition result word sequence is determined to be one word in advance, or when a speech recognition result word sequence is one word, the above processing does not need to be carried out in particular. That is, only determination needs to be carried out with respect to whether the word is an unknown word that does not exist in the word dictionary for recognition or not without determining a segment. Also, if a result of recognition is only one word, determination does not need to be carried out with respect to whether the word corresponds to a predetermined condition or not in particular.

Finally, the display section 5 outputs the speech recognition result word sequence "映画館を探したい (eigaban wo sagashitai)" on a display and the like after converting the speech recognition result word sequence as follows. A recognition result word sequence is displayed with a highlighted segment determined as an unknown word by the segment determination section 4. For example, a segment is enclosed by signs "[" and "]" so as to express that the segment is determined as an unknown word by a system after replacing a syllable sequence of the segment with a syllable sequence of the same segment of a recognition result syllable sequence. By the above processing, the recognition result word sequence is converted to "[えいががん]を探したい ([eigagan] wo sagashitai)" as shown in FIG. 2. In this case, a partial syllable sequence of a segment where "[えいががん] ([eigagan]) is considered as an unknown word is shown.

In addition, together with the character sequence obtained in the above manner, for example, word entries of the word dictionary 32 for recognition which is arranged in the Japanese syllabary order are displayed partially as shown in FIG. 2. At this time, word entries in the vicinity of a position (in FIG. 2, "[えいががん] (eigagan)" is arranged at a position in front of "えいきょう (eikyou)" and at the back of "えーゆー (eeyuu)") where the syllable sequence ("[えいががん] (eigagan)") used to replace an unknown word segment should exist as a word entry in the word dictionary 32 for recognition arranged in the Japanese syllabary order are displayed. In the example of FIG. 2, as word entries in the word dictionary 32 for recognition, six character sequences for display ("へ (he)", "絵 (e (picture)) ", "えー (ee)", ""英雄 (eiyuu (hero))", "影響 (eikyou (influence)) ", and "英語 (eigo (English))" are displayed together with reading information thereof "え (e)", "え (e)", "えー (ee)", "えーゆー (eeyuu)", ""えいきょう (eikyou)", and "えいご (eigo)"). However, other information stored in each word entry in the word dictionary 32 for recognition may be displayed, or only the character sequences for display may be considered to be displayed.

In the example described above, the recognition result word sequence "英語版 (eigoban)" of a segment determined as an unknown word is replaced by a syllable sequence "[えいががん] (eigagan) ", and is expressed by signs" [" and "]". However, other means may be used as long as the user can easily understand a segment determined by the segment determination section 4 as an unknown word. For example, means such as using other signs, drawing an underline, and changing a font color, a background color, a size, or a font of a syllable sequence after replacement can be considered. In addition, word entries of the word dictionary 32 for recognition are displayed in a state of being arranged in the Japanese syllabary order that can be most easily understood intuitively by the user. However, other arranging order than the Japanese syllabary order can be used as long as the arranging order can be understood by the user.

In addition, after a content is output in the manner described in the above example, the output content can be changed by receiving an instruction and operation of the user. For example, when a syllable sequence that is different from a word uttered by the user is displayed in error, and word entries of the word dictionary 32 for recognition at locations which should not be displayed in the first place are displayed, word entries at correct locations can be displayed by changing positions of word entries of the word dictionary 32 for recognition displayed by a scrolling function such as a scroll bar 40 of FIG. 4.

In addition, the segment determination section 4 is also considered to change a range or a position of a determined segment by input by a cross key or cursor movement by mouse operation. More specifically, in case the segment determination section 4 determines an unknown word segment as "映画 (eiga (movie))" in error in the above example, and outputs a result in accordance with the segment, and if the user changes the segment to "映画 版 (eigaban)", a syllable sequence "[えいががん] (eigagan)" corresponding to the changed segment is obtained, and word entries in the word dictionary 32 for recognition based on the syllable sequence are newly displayed on a display screen.

Further, in the above example, an example where the user can check input of un unknown word is shown. However, when a word uttered by the user exists in displayed word entries in the word dictionary 32 for recognition (that is, when the system determines the word as an unknown word in error), or when the user desires to input a word or the like that is different from the word input by speech by the user, such as a synonym, each of the displayed word entries of the word dictionary 32 for recognition is selected, and a function to replace the selected word entry and a character sequence in a segment determined by the segment determination section 4 is included. In this manner, a recognition result character sequence can be corrected.

As described above, the examples of the present invention have been described in detail. However, the present invention is not limited to the examples described above which were exemplified representatively. A person skilled in the art can make modification and alteration to a variety of modes within a range not deviating from the gist of the present invention, based on the described content of claims. These modified examples and altered example also belong to a range of claims of the present invention.

For example, in the above example, the display section is described as the output section. However, the present invention is not necessarily limited thereto, and the present invention can be applied to any outputting means other than the display section, such as a sound output device like a speaker, and a print device like a printer, as long as the outputting means can allow the user to check a result of recognition. Any display device, such as a cathode ray tube (CRT), a liquid crystal display, and an organic EL (OLEO) display, can be used, as long as the display device can display a result of recognition on a display screen in a visually recognizable manner.

In addition, in the examples described above, a case in which Japanese is used as a used language is exemplified. However, the present invention is not necessarily limited thereto. The present invention can be applied to a case in which other languages, such as English, are used as a used language. For example, in case English is used as a used language, the alphabetical order may be used as the order defined for word entries. Further, dictionaries corresponding to a plurality of languages being used may be prepared in advance, and speech recognition may be carried out by using a dictionary for a language being used selected by operation of the user and an instruction signal corresponding to the operation of the user from the dictionaries.

In addition, with respect to the speech recognition system described above, hardware and software configurations thereof are not limited in particular. Any hardware and software configurations may be applied as long as such configurations can achieve a function (means) of each of the sections described above. For example, any of a circuit that is configured independently for a function of each of the sections, or a plurality of functions configured in an integrated manner in one circuit, may be used. Alternatively, all functions may be achieved mainly by processing of software.

Further, when at least a part of functions of each of the sections configuring the speech recognition system described above is achieved by using a program code, the program code and a recording medium recording the program code are included in the scope of the present invention. In this case, when the above functions are achieved in association with other software such as an operating system, a program code of such other software is also included.

Industrial Applicability

The present invention can be applied for the purpose of displaying a result of speech recognition in a system that recognizes speech uttered by the user and carries out search and translation by using a result of the recognition.

The invention claimed is:

1. A speech recognition system, comprising:
a word speech recognition unit that converts input speech to a recognition result word sequence by using a predetermined word dictionary for recognition, the word dictionary including word entries arranged in a predetermined order;
a syllable recognition unit that converts the input speech to a recognition result syllable sequence;
a segment determination unit that determines a segment corresponding to an unknown word in the converted recognition result word sequence; and
an output unit that obtains a partial syllable sequence corresponding to the determined segment from the recognition result syllable sequence, determines an ordered position of the partial syllable sequence in the word dictionary on the assumption that the partial syllable sequence exists in the word dictionary, and displays on a display device one or more word entries in the vicinity of the ordered position in the word dictionary, together with the recognition result word sequence,
wherein the output unit displays the recognition result word sequence after replacing the recognition result word sequence with the partial syllable sequence with respect to the segment determined by the segment determination unit, and the output unit highlights the segment corresponding to the unknown word.

2. The speech recognition system according to claim 1, wherein the syllable recognition unit uses a predetermined syllable dictionary for recognition to convert the input speech to the recognition result syllable sequence.

3. The speech recognition system according to claim 1, wherein the predetermined order is the Japanese syllabary order.

4. The speech recognition system according to claim 1, wherein the output unit changes the output word entries of the word dictionary in accordance with an instruction of a user.

5. The speech recognition system according to claim 1, wherein when a user selects a word entry in the word dictionary, the output unit replaces a character sequence displayed in the segment determined by the segment determination unit with a character sequence used for display of the selected word entry.

6. The speech recognition system according to claim 1, wherein the output unit changes a range of the segment determined by the segment determination unit by an instruction of a user.

7. The speech recognition system according to claim 6, wherein the output unit changes an output content in accordance with a new segment obtained by changing the range in accordance with the instruction of the user.

8. A speech recognition result output method, comprising:
a word speech recognition step of converting input speech to a recognition result word sequence by using a predetermined word dictionary for recognition, the word dictionary including word entries arranged in a predetermined order;
a syllable recognition step of converting the input speech to a recognition result syllable sequence;
a segment determination step of determining a segment corresponding to an unknown word in the converted recognition result word sequence; and
an output step of obtaining a partial syllable sequence corresponding to the determined segment from the recognition result syllable sequence, determining an ordered position of the partial syllable sequence in the word dictionary on the assumption that the partial syllable sequence exists in the word dictionary, and displaying on a display device one or more word entries in the vicinity of the ordered position in the word dictionary, together with the recognition result word sequence,
wherein in the output step, the recognition result word sequence is displayed after the recognition result word sequence is replaced with the partial syllable sequence with respect to the segment determined by the segment determination step, and in the output step, the segment corresponding to the unknown word is highlighted.

9. The speech recognition result output method according to claim 8, wherein in the speech recognition step, a predetermined syllable dictionary for recognition is used to convert the input speech to the recognition result syllable sequence.

10. The speech recognition result output method according to claim 8, wherein the predetermined order is the Japanese syllabary order.

11. The speech recognition result output method according to claim 8, wherein in the output step, the displayed word entries of the word dictionary are changed in accordance with an instruction of a user.

12. The speech recognition result output method according to claim 8, wherein in the output step, when a user selects a word entry in the word dictionary, a character sequence displayed in the segment determined by the segment determination step is replaced with a character sequence used for display of the selected word entry.

13. The speech recognition result output method according to claim 8, wherein in the output step, a range of the segment determined by the segment determination step is changed in accordance with the instruction of a user.

14. The speech recognition result output method according to claim 13, wherein in the output step, an output content is changed in accordance with a new segment obtained by changing the range in accordance with the instruction of the user.

15. A non-transitory recording medium encoded with program code, when the program code is executed by a processor, performing:
word speech recognition processing for converting input speech to a recognition result word sequence by using a predetermined word dictionary for recognition, the word dictionary including word entries arranged in a predetermined order;
syllable recognition processing for converting the input speech to a recognition result syllable sequence;
segment determination processing for determining a segment corresponding to an unknown word in the converted recognition result word sequence; and
output processing for obtaining a partial syllable sequence corresponding to the determined segment from the recognition result syllable sequence, determining an ordered position of the partial syllable sequence in the word dictionary on the assumption that the partial syllable sequence exists in the word dictionary, and displaying on a display device one or more word entries in the vicinity of the ordered position in the word dictionary, together with the recognition result word sequence,
wherein in the output processing, the recognition result word sequence is displayed after the recognition result word sequence is replaced with the partial syllable sequence with respect to the segment determined by the segment determination processing, and in the output processing, the segment corresponding to the unknown word is highlighted.

16. The non-transitory recording medium according to claim 15, wherein in the syllable recognition processing, a predetermined syllable dictionary for recognition is used to convert the input speech to the recognition result syllable sequence.

17. The non-transitory recording medium according to claim 15, wherein the predetermined order is the Japanese syllabary order.

18. The non-transitory recording medium according to claim 15, wherein in the output processing, the displayed word entries of the word dictionary is changed in accordance with an instruction of a user.

19. The non-transitory recording medium according to claim 15, wherein in the output processing, when a user selects a word entry in the word dictionary for recognition, a character sequence displayed in the segment determined by the segment determination processing is replaced with a character sequence used for display of the selected word entry.

20. The non-transitory recording medium according to claim 15, wherein in the output processing, a range of the segment determined by the segment determination processing is changed in accordance with the instruction of a user.

21. The non-transitory recording medium according to claim 20, wherein an output content is changed in accordance with a new segment obtained by changing the range in accordance with the instruction of the user.

* * * * *